US010070275B1

(12) United States Patent
McGary

(10) Patent No.: US 10,070,275 B1
(45) Date of Patent: Sep. 4, 2018

(54) DEVICE AND METHOD FOR DEPLOYING A PLURALITY OF MOBILE DEVICES

(71) Applicant: MOTOROLA SOLUTIONS, INC., Chicago, IL (US)

(72) Inventor: Vance M McGary, Miami, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/720,184

(22) Filed: Sep. 29, 2017

(51) Int. Cl.
*H04W 72/00* (2009.01)
*H04W 4/08* (2009.01)
*G06K 9/00* (2006.01)

(52) U.S. Cl.
CPC .......... *H04W 4/08* (2013.01); *G06K 9/00288* (2013.01)

(58) Field of Classification Search
CPC .... H04L 47/2441; H04L 5/0064; H04W 4/06; H04W 8/18; H04W 28/06; H04W 72/048; H04W 28/00
USPC ............... 455/422.1, 450–455, 464, 509; 370/328–337, 339, 341–348, 431–463
See application file for complete search history.

(56) References Cited

U.S. PATENT DOCUMENTS

| 9,189,682 | B2 | 11/2015 | Salvador et al. |
| 9,520,957 | B2 | 12/2016 | Ramirez Flores et al. |
| 2005/0213525 | A1* | 9/2005 | Grayson .............. H04W 4/06 370/312 |
| 2007/0140532 | A1 | 6/2007 | Goffin |
| 2013/0047175 | A1* | 2/2013 | Ramirez Flores ..... H04H 60/45 725/12 |
| 2014/0294257 | A1 | 10/2014 | Tussy |
| 2015/0215128 | A1* | 7/2015 | Pal .................. H04L 9/3228 713/155 |
| 2015/0227782 | A1* | 8/2015 | Salvador ............ G06K 9/00221 382/118 |
| 2016/0065710 | A1* | 3/2016 | Lee .................. H04M 1/6091 455/41.3 |

* cited by examiner

*Primary Examiner* — Ronald Eisner
(74) *Attorney, Agent, or Firm* — Perry + Currier, Inc.

(57) ABSTRACT

A device and method for deploying a plurality of mobile devices is provided. The device comprises: a communication interface configured to communicate with mobile devices; and a controller having access to a memory storing: respective facial images of users, and relationships between the users. The controller: receives, via the communication interface, a digital image including faces; identifies the users in the digital image, based on: the faces in the digital image, and the respective facial images of the users stored in the memory; determines relationships between the users identified in the digital image using the relationships between the users stored in the memory; assigns the mobile devices to the users in the digital image; and distributes, using the communication interface, respective resources to the mobile devices based on a respective assigned user and the relationships between the users identified in the digital image.

18 Claims, 16 Drawing Sheets

DEVICE AND METHOD FOR DEPLOYING A PLURALITY OF MOBILE DEVICES

BACKGROUND OF THE INVENTION

Mobile devices and/or portable radios are essential in emergency situations, but such devices are becoming more complex with configuration settings based on the users and their preferences (e.g. names, aliases, channel scanning priority preferences, alert tones, and the like). In emergency situations, such as a fire, and/or an "immediately dangerous to life and health" (IDLH) environment such devices must be deployed and configured quickly, with the individual user setting downloaded to each of the devices. For example, a crew often arrives at an IDLH environment, and mobile devices from a pool are distributed to the members of the crew. As each crew member logs into a device, the device contacts a remote server to retrieve device settings and data for the crew member. Time is hence generally lost in both assigning and configuring the mobile devices for use by the crew, which can include firefighters, paramedics, police, and the like, which can lead to time lost in deploying the crew into the IDLH environment.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
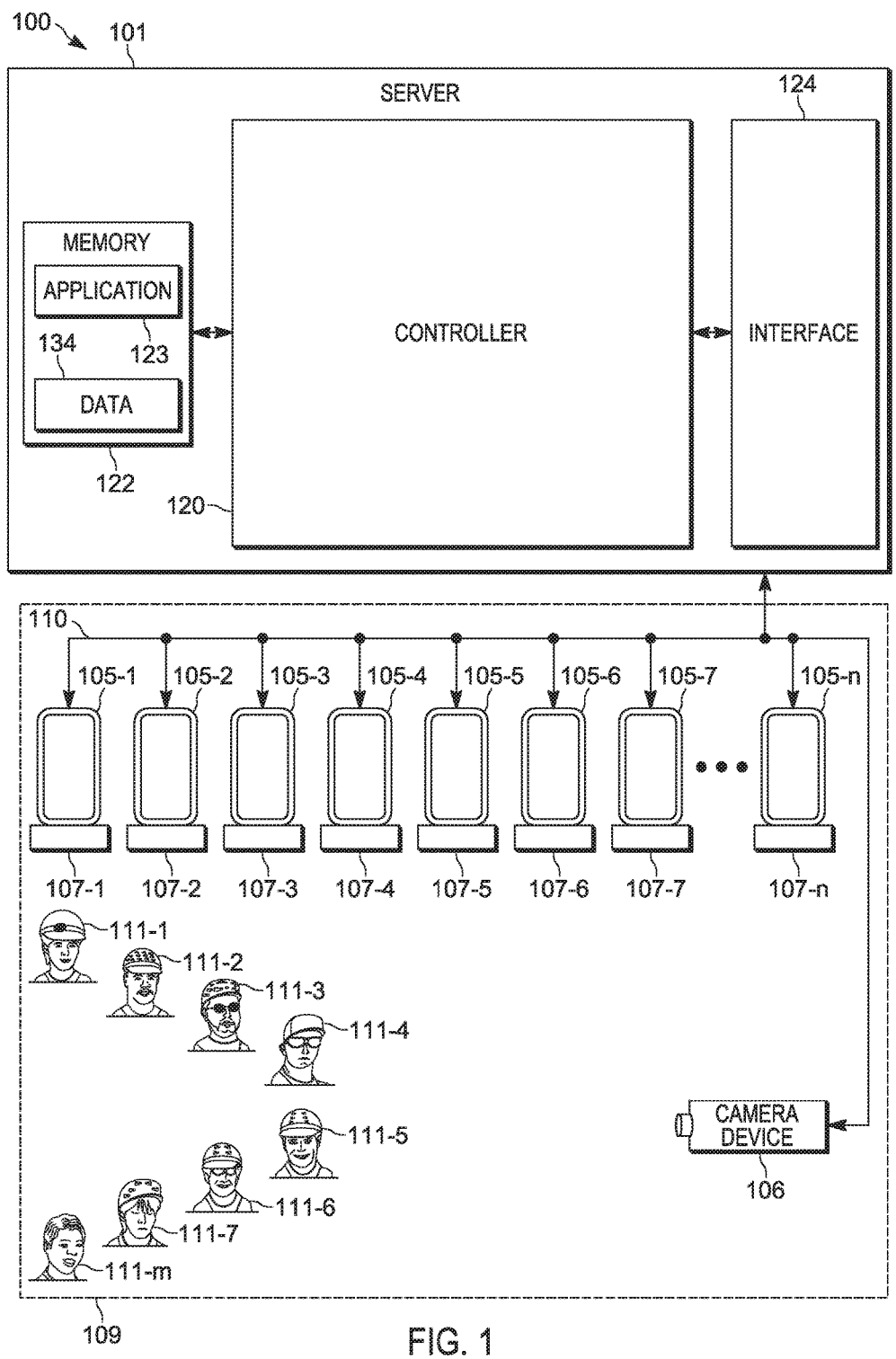
FIG. 1 is schematic diagram of a system for deploying mobile devices in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An aspect of the specification provides a device comprising: a communication interface configured to communicate with a plurality of mobile devices; and a controller having access to a memory storing: respective facial images of a plurality of users, and relationships between the plurality of users, the controller configured to: receive, via the communication interface, a digital image including faces; identify the plurality of users in the digital image, based on: the faces in the digital image, and the respective facial images of the plurality of users stored in the memory; determine relationships between the plurality of users identified in the digital image using the relationships between the plurality of users stored in the memory; assign the plurality of mobile devices to the plurality of users in the digital image; and distribute, using the communication interface, respective resources to the plurality of mobile devices based on a respective assigned user and the relationships between the plurality of users identified in the digital image.

Another aspect of the specification provides a method comprising: receiving, at a controller, via a communication interface, a digital image including faces, the communication interface configured to communicate with a plurality of mobile devices, the controller having access to a memory storing: respective facial images of a plurality of users, and relationships between the plurality of users; identifying, at the controller, the plurality of users in the digital image, based on: the faces in the digital image, and the respective facial images of the plurality of users stored in the memory; determining, at the controller, relationships between the plurality of users identified in the digital image using the relationships between the plurality of users stored in the memory; assigning, at the controller, the plurality of mobile devices to the plurality of users in the digital image; and distributing, using the communication interface, respective resources to the plurality of mobile devices based on a respective assigned user and the relationships between the plurality of users identified in the digital image.

FIG. 1 is a block diagram of a system 100 that includes a server 101, a plurality of mobile devices 105-1, 105-2, 105-3, 105-4, 105-5, 105-6, 105-7 . . . 105-$n$ and a camera device 106. The plurality of mobile devices 105-1, 105-2, 105-3, 105-4, 105-5, 105-6, 105-7, . . . 105-$n$ will be interchangeably referred to hereafter, collectively, as devices 105, and generically as a device 105.

A number "$n$" of the devices 105 may include as few as two devices 105, but may include tens, hundreds and even thousands of devices 105 depending, for example, on a number of devices 105 being managed for users and/or first responders and/or emergency responders within the system 100.

In addition, each of the devices 105 are located at a respective battery charger 107-1, 107-2, 107-3, 107-4, 107-5, 107-6, 107-7 . . . 107-$n$. The plurality of battery chargers 107-1, 107-2, 107-3, 107-4, 107-5, 107-6, 107-7, . . . 107-$n$ will be interchangeably referred to hereafter, collectively, as chargers 107, and generically as a charger 107. The chargers 107 are generally used to charge a battery of a respective device 105. Furthermore, the chargers may be combined as one or more cradles that include a subset of the chargers 107.

As depicted, the devices 105 and the camera device 106 are at a location 109, for example associated with an event that can include, but is not limited to, an "immediately dangerous to life and health" (IDLH) event and/or environment, a fund-raising event (e.g. a walkathon), and the like. However, the location 109 may also include a beginning position and/or staging ground for the event; for example, a fire may be several kilometers away from the location 109, and the location 109 may be an area where first responders are being organized to deploy to fight the fire. Similarly, the location 109 may be a staging ground for a walkathon, and the like. Regardless, the devices 105 are to be deployed to users participating in the event.

Hence, a plurality of users 111-1, 111-2, 111-3, . . . 111-$m$ are also located at the location 109. The users 111-1, 111-2, 111-3, . . . 111-$m$ will be interchangeably referred to hereafter, collectively, as users 111, and generically as a user 111. Each of the users 111 can be a participant in an event associated with the location 109, and can include, but is not limited to, first responders, emergency responders, participants in the event, and the like. A number "$m$" of the users 111 may include as few as two users 111, but may include tens, hundreds and even thousands of users 111 depending, for example, on a number of users 111 being deployed for the event associated with the location 109.

As depicted, the devices 105 and the camera device 106 are in communication with the server 101, using respective links 110. As described in examples herein, the server 101 may assign the devices 105 to the users 111 based on: a digital image of the users 111 as received from the camera device 106, respective facial images of the plurality of users 111 stored at a memory accessible to the server 101, and relationships between the plurality of users 111 as also stored at the memory accessible to the server 101.

Hence, in specific embodiments, the system 100 comprises components of a mobile device provisioning system, including, but not limited to, a mobile device provisioning system used to assign mobile devices to first responders and/or emergency responders working for and/or with a public safety organization (generically referred to hereafter as first responders and/or users), and the server 101 comprises one or more mobile device provisioning servers, and the like, including, but not limited to, server computing devices, personal computers, laptop computers, and the like. Such mobile device provisioning servers, and the like, control mobile device provisioning, and optionally manage communications to and from the devices 105. As such, the server 101 may store records of at least a portion of the users 111, as described below with respect to FIG. 2. Such information may be used to determine which device 105 to assign to a user 111.

The camera device 106 generally comprises any camera device configured to acquire digital images and transmit acquired digital images to the server 101. Indeed, the camera device 106 can include one of the devices 105, presuming a device 105 used as the camera device 106 has a digital camera incorporated therein.

As depicted, the server 101 comprises: a controller 120, a memory 122, storing an application 123, and a communication interface 124, interchangeably referred to hereafter as the interface 124. The controller 120 is generally configured for communication with the devices 105, and the camera device 106, using the communication interface 124 and the links 110.

The controller 120 includes one or more logic circuits, one or more processors, one or more microprocessors, one or more ASIC (application-specific integrated circuits) and one or more FPGA (field-programmable gate arrays). In some embodiments, the controller 120 and/or the server 101 is not a generic controller and/or a generic device, but a device specifically configured to assign a mobile device 105 to a user 111 based on a digital image of the users 111, for example to reduce a time for assigning the devices 105 to the users 111. For example, in some embodiments, the server 101 and/or the controller 120 specifically comprises a computer executable engine configured to implement mobile device assignment functionality.

The memory 122 is a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random access memory ("RAM")). In the embodiment of FIG. 1, programming instructions (e.g., machine readable instructions) that implement the functional teachings of the server 101 as described herein are maintained, persistently, at the memory 122 and used by the controller 120 which makes appropriate utilization of volatile storage during the execution of such programming instructions.

In particular, the memory 122 of FIG. 1 stores instructions corresponding to the application 123 that, when executed by the controller 120, enables the controller 120 to implement data mobile device assignment functionality associated with the application 123. In the illustrated example, when the controller 120 executes the application 123, the controller 120 is enabled to: receive, via the communication interface 124, a digital image including faces; identify the plurality of users 111 in the digital image, based on: the faces in the digital image, and the respective facial images of the plurality of users stored in a memory (for example the memory 122); determine relationships between the plurality of users 111 identified in the digital image using the relationships between the plurality of users 111 stored in the memory; assign the plurality of mobile devices 105 to the plurality of users 111 in the digital image; and distribute, using the communication interface 124, respective resources to the plurality of mobile devices 105 based on a respective assigned user and the relationships between the plurality of users 111 identified in the digital image.

As depicted, the memory 122 further stores data 134 used by the server 101 and/or the controller 120 to assign a mobile device 105 to a user 111. The data 134 will be described in more detail below with respect to FIG. 2.

However, in some embodiments, the data 134 may be at least partially stored at another memory accessible to the controller 120 (e.g. at another server and/or another device), and the controller 120 is in communication with the other memory, and the data 134 stored at the other memory may be retrieved from the other memory upon request by the controller 120.

The interface 124 is generally configured to communicate with the devices 105 the camera device 106, using wired and/or wired links 110 as desired, including, but not limited to, cables, WiFi links and the like. In other words, the links 110 may include any suitable combination of wired networks and/or wireless networks.

In some embodiments, the interface 124 is further configured to communicate with the devices 105 for example, using one or more communication channels over the links 110. In these embodiments, the interface is implemented by, for example, one or more radios and/or connectors and/or network adaptors, configured to communicate wirelessly, with network architecture that is used to implement one or more communication channels between the server 101 and the device 105 and/or a wireless network. In these embodiments, the interface 124 may include, but is not limited to, one or more broadband and/or narrowband transceivers, such as a Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver operating in accordance with an IEEE 902.16 standard, and/or other similar type of wireless transceiver configurable to communicate via a wireless network for infrastructure communications.

In yet further embodiments, the interface 124 includes one or more local area network or personal area network transceivers operating in accordance with an IEEE 902.11 standard (e.g., 902.11a, 902.11b, 902.11g, and the like), or a Bluetooth™ transceiver which may be used to communicate with the devices 105 and the camera device 106. In some embodiments, the interface 124 is further configured to communicate "radio-to-radio" on some communication channels (e.g. in embodiments where the interface 124 includes a radio), while other communication channels are configured to use wireless network infrastructure.

Example communication channels over which the interface 124 may be generally configured to wirelessly communicate include, but are not limited to, one or more of wireless channels, cell-phone channels, cellular network channels, packet-based channels, analog network channels, Voice-Over-Internet ("VoIP"), push-to-talk channels and the like, and/or a combination.

However, in other embodiments, the interface 124 communicates with the devices 105 and the camera device 106 using other servers and/or communication devices, for example by communicating with the other servers and/or communication devices using, for example, packet-based and/or internet protocol communications, and the like, and the other servers and/or communication devices use radio communications to wirelessly communicate with the devices 105 and the camera device 106.

Indeed, communication between the server 101, the devices 105, and the camera device 106, may further include any suitable combination of wired networks and/or wireless networks. In other words, the links 110 may include any suitable combination of wired networks and/or wireless networks.

Hence, the server 101 may be remote from the devices 105 and the camera device 106. However, the server 101 may also be local to the devices 105, and the camera device 106.

In any event, it should be understood that a wide variety of configurations for the system 100 and/or the server 101 are within the scope of present embodiments.

Figure 2:
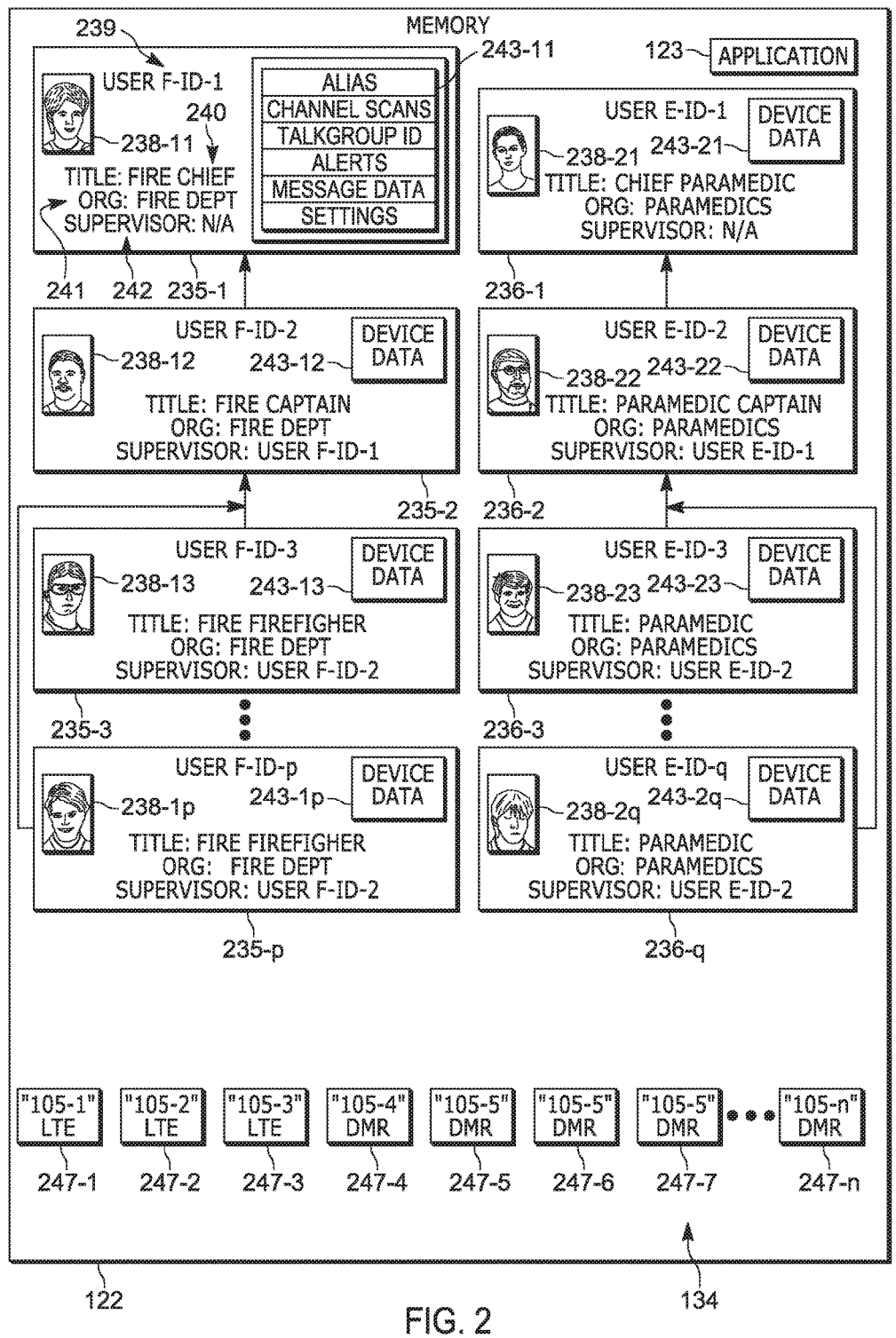
FIG. 2 is a block diagram of a memory of a server in the system of FIG. 1 in accordance with some embodiments.

Attention is next directed to FIG. 2 which depicts an example of the data 134 stored at the memory 122. In particular, the data 134 includes a plurality of user records 235-1, 235-2, 235-3 . . . 235-$p$, 236-1, 236-2, 236-3 . . . 236-1, will be interchangeably referred to hereafter, collectively, as records 235, 236 and generically as a record 235 or a record 236.

The records 235, 236 are generally associated with at least a portion of the users 111. For example, the records 235 include data for the users 111 who are members of a fire department, and the records 236 include data for the users 111 who are members of a paramedic department. Hence, each of the records 235, 236 can include, but is not limited to, employee records of at least a portion of the users 111.

However, while present embodiments will be described with respect to firefighters and paramedics, the records 235, 236 may include records for other types of first responders, including, but not limited to, police officers and the like. Alternatively, the records 235, 236 may include records for any participant in an event associated with the location 109 and/or a digital image acquired by the camera device 106.

As depicted there are a number "p" of records 235 associated with a fire department and a number "q" of records 236 associated with a paramedic department. A number "p" of the user records 235, and a number "q" of the user records 236 may include as few as one user record 235 and one user record 236, but may include tens, hundreds and even thousands of user records 235, 236 depending, for example, on a number of users and/or first responders and/or emergency responders being managed within the system 100. Furthermore, in some implementations, the records 235, 236 may include records for only one type of user and/or first responder (for example only fire fighters or only paramedics); either way there may be as few as two records 235, 236.

Furthermore, each record 235, 236 includes a respective facial image 238-11, 238-12, 238-13, . . . 238-1$p$, . . . 238-21, 238-22, 238-23, . . . 238-2 (interchangeably referred to, collectively, as facial images 238 and as a facial image 238). Each record 235, 236 and the respective facial images 238 may be provisioned at the data 134, for example, when a user, a first responder, and the like, is registered with the server 101, for example, when they join an associated organization and/or register for an event.

An example record 235-1 will now be described. The record 235-1 includes the facial image 238-1 of an associated user 111, and data associated with the user 111 including, but not limited to: a user identifier 239 (e.g. "F-ID-1", a job title 240 (e.g. "Fire Chief"), an organization 241 (e.g. "Fire Dept"), and an indication 242 of a supervisor (e.g. as depicted "N/A" or "Not Applicable" as the record 235-1 is for the chief of the fire department and hence does not have a supervisor).

The record 235-1 further includes device data 243-11 that includes resources that can be provisioned to a device 105 assigned to the user 111 associated with the record 235-1 including, but not limited to: an alias of a respective assigned user, channel scans associated with the respective assigned user, talkgroup identifiers associated with the respective assigned user, audio alerts associated with the respective assigned user, preconfigured messaging data associated with the respective assigned user and predefined device settings. In other words, the device data 243-11 comprises data and/or resources associated with a user 111 that can be used to configure a device 105.

Indeed, each of the records 235, 236 includes respective device data 243-11, 243-12, 243-13, . . . 243-1p, . . . 243-21, 243-22, 243-23, . . . 243-2 (interchangeably referred to, collectively and generically, as device data 243). An initial set of device data 243 may be provisioned for each record 235, 236 when each user and/or first responder is registered with the server 101. However, the device data 243 may be further generated and/or maintained and/updated by the server 101 (and/or a server managing the memory 122) on an on-going basis. For example, devices, such as devices 105, are generally temporarily assigned to the users 111, for example at the start of a shift and/or an event; as the users 111 use the temporarily assigned devices for messaging, etc., they may download and/or use applications, add contacts, set up channel scans and/or talkgroups, change alerts, change device settings and the like. The data reflecting the user interactions with the temporarily assigned device is uploaded to the memory 122 such that, when the temporarily assigned device is returned to a shared pool of devices (e.g. at the end of a shift and/or an event), the records 235, 236 store the device data 243. Hence, when another device (including a device 105) is temporarily assigned to a user 111, the device data 243 associated with that user 111 may be transmitted to the device such that the user 111 has their device data 243 available. Furthermore, the device data 243 may be maintained and/or updated while a user 111 is not temporarily assigned a device; for example, messages transmitted to a user 111 (e.g. at an email address, a phone number and the like) between shifts are stored at the device data 243.

Furthermore, the records 235, 236 define relationships between the users 111. For example, as depicted, the supervisor of the user 111 associated with the user record 235-2 is the user 111 associated with the user record 235-1. Such relationships are furthermore graphically indicated in FIG. 2 using arrows between the records 235, 236, with an arrow from a "subordinate" record 235 (and/or a record 236) to another "supervisor" record 235 (and/or a record 236) indicating a subordinate/supervisor and/or a "report-to" and/or hierarchical relationship. As such the records 235, 236 define a hierarchy among the plurality of users 111 and/or among groups of the plurality of users 111 including, but not limited to, one or more of: working relationships between the plurality of users 111, a reporting structure and a priority structure. For example, users 111 associated with records 235, 236 that are higher in the hierarchy can be associated with a higher priority than users 111 associated with records 235, 236 that are lower in the hierarchy.

As depicted, the records 235 define a hierarchy in a fire department, while the records 236 define a hierarchy in a paramedic department. While there is no indicated hierarchy between the records 235 and the records 236, it is understood that a hierarchy can be generated from the records 235, 236 based, for example, on reporting structures, a number of users 111 supervised, relative positions in each of the hierarchies, titles, and the like.

As depicted, the data 134 stored at the memory 122 further includes a plurality of device records 247-1, 247-2, 247-3, 247-4, 247-5, 247-6, 247-7 . . . 247-n, interchangeably referred to hereafter, collectively, as device records 247, and generically as a device record 247.

The device records 247 generally include data associated with a respective device 105, and hence may be in a one-to-one relationship with the devices 105 (e.g. there are a number "n" devices 105 and a number "n" device records 247). The device records 247 may include: a device identifier (e.g. a respective MAC (media access control) identifier, an assigned identifier (e.g. an inventory identifier) and the like, the device identifier generally indicated as "105-n"); and capabilities and/or resources available at each device 105, including, but not limited to, communication capabilities.

For example, the respective records 247-1, 247-2, 247-3 for the devices 105-1, 105-2, 105-3 indicate that they communicate using "LTE" (e.g. the Long-Term Evolution mobile communications standard), while the records 247-4, 247-5, 247-6, 247-7 . . . 247-n for the devices 105-4, 105-5, 105-6, 105-7 . . . 105-n indicate that they communicate using "DMR" (e.g. the Digital Mobile Radio communications standard).

Figure 3:
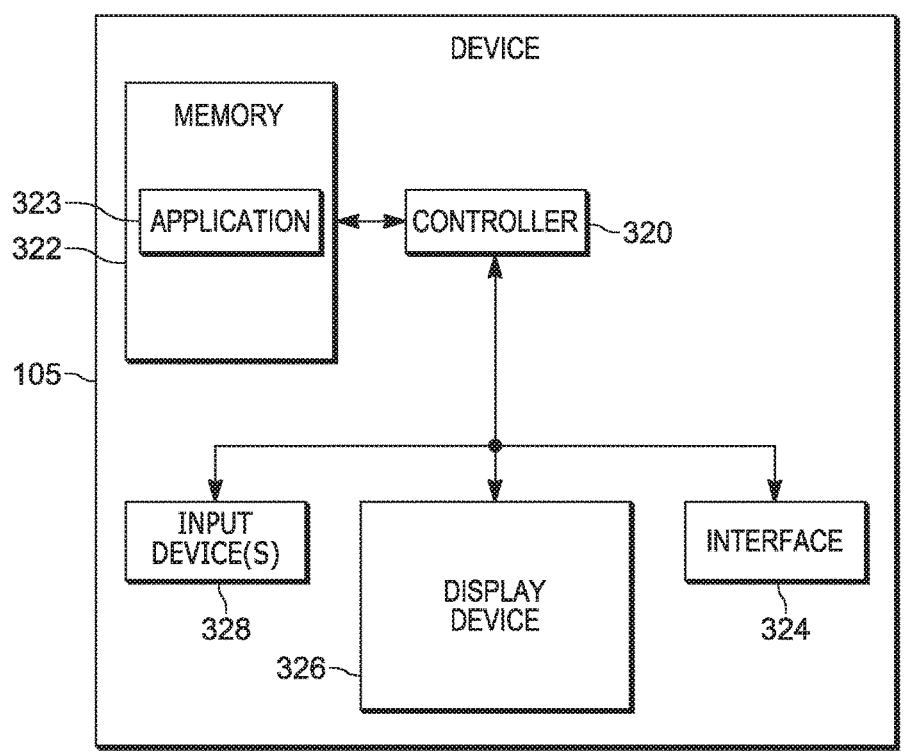
FIG. 3 is a block diagram of mobile device in the system of FIG. 1 in accordance with some embodiments.

Attention is next directed to FIG. 3 which depicts a block diagram of an example device 105.

Each of the devices 105 generally comprises a mobile device which includes, but is not limited to, any suitable combination of electronic devices, communication devices, portable radios, computing devices, portable electronic devices, mobile computing devices, portable computing devices, tablet computing devices, telephones, PDAs (personal digital assistants), cellphones, smartphones, e-scanners, mobile camera devices and the like.

In some embodiments, one or more of the devices 105 are specifically adapted for use as a public safety device and may be deployed and/or managed by a public safety and/or first responder agency including, but not limited to, police organizations, health organizations, intelligence organizations, military organizations, government organizations, and the like.

Indeed, in some embodiments, one or more of the devices 105 are specifically adapted for emergency service radio functionality, and the like, used by emergency responders and/or emergency responders, including, but not limited to, police service responders, fire service responders, emergency medical service responders, and the like. In some of these embodiments, the devices 105 further includes other types of hardware for emergency service radio functionality, including, but not limited to, push-to-talk ("PTT") functionality.

However, the devices 105 may further be adapted for use as a consumer device and/or business device, and the like, and/or may include additional or alternative components related to, for example, telephony, messaging, entertainment, and/or any other components that may be used with computing devices and/or communication devices.

As depicted in FIG. 3 an example device 105 comprises a respective controller 320, a memory 322 storing an application 323 and a communication interface 324, interchangeably referred to hereafter as the interface 324, and optionally a display device 326 (e.g. a flat panel display, and the like) and at least one input device 328 (e.g. a keyboard, a touch screen, a point device, buttons, and the like). The controller 320, the memory 322, and the interface 324 are each respectively similar to the controller 120, the memory 122 and the interface 124, adapted, however, for use in a mobile device. While not depicted, the device 105 may further include one or more speakers and/or one or more microphones and/or one or more lights and/or one or more haptic devices and/or one or more notification devices and/or one or more location determining devices (e.g. a Global Positioning System device, and the like) and the like.

The application 323, when executed by the controller 320, enables the controller 320 1 to implement functionality of the mobile device 105 including, but not limited to, receiving data from the server 101 and configuring resources at the device 105 based on the data received from the server 101.

In any event, it should be understood that a wide variety of configurations for the devices 105 are within the scope of present embodiments.

Figure 4:
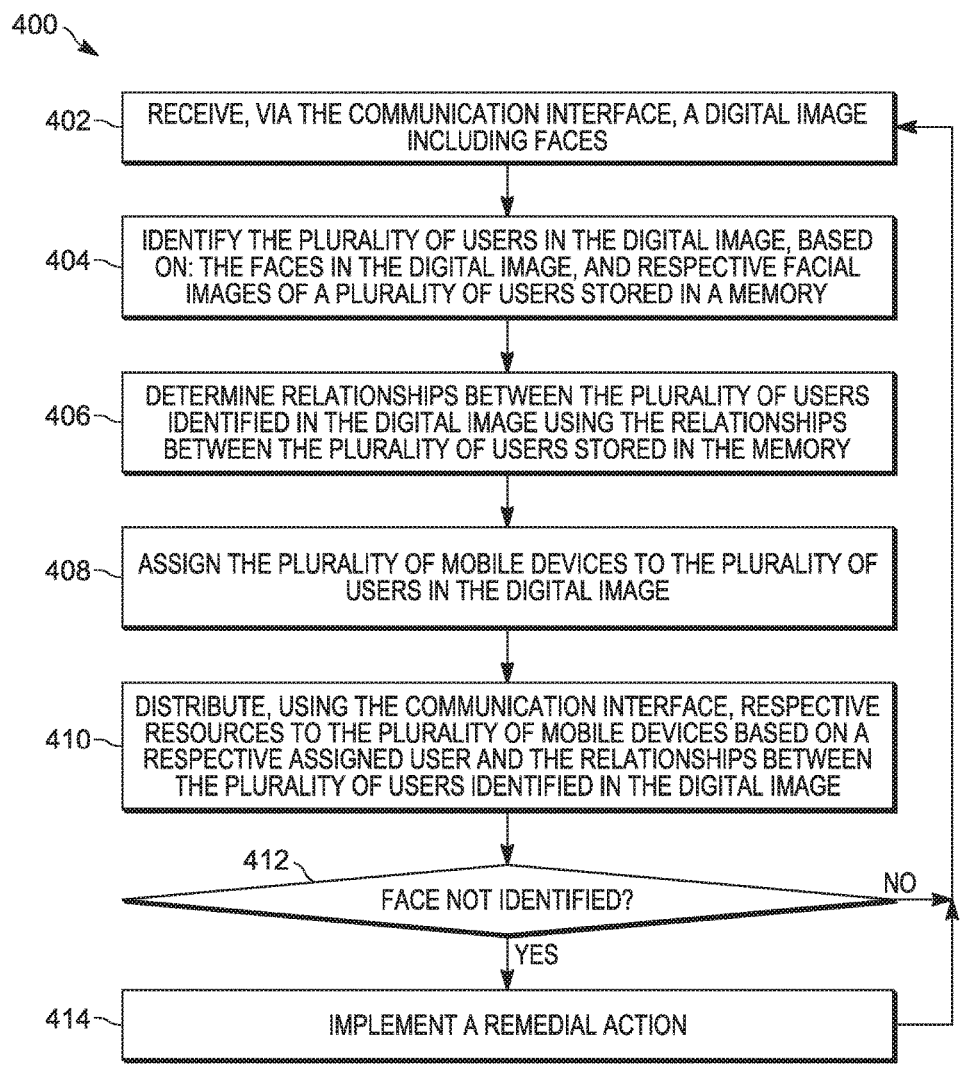
FIG. 4 is a flowchart of a method of deploying mobile devices in accordance with some embodiments.

Attention is now directed to FIG. 4 which depicts a flowchart representative of a method 400 for deploying mobile devices. In some embodiments, the operations of the method 400 of FIG. 4 correspond to machine readable instructions that are executed by, for example, the server 101 of FIG. 1, and specifically by the controller 120 of the server 101. In the illustrated example, the instructions represented by the blocks of FIG. 4 are stored at the memory 122, for example, as the application 123. The method 400 of FIG. 1 is one way in which the system 100 and/or the server 101 and/or the controller 120 is configured. Furthermore, the following discussion of the method 400 of FIG. 4 will lead to a further understanding of the server 101, and its various components.

However, it is to be understood that the system 100 and/or the server 101 and/or the controller 120 and/or the method 400 may be varied, and need not work exactly as discussed herein in conjunction with each other, and that such variations are within the scope of present embodiments.

Furthermore, the method 400 of FIG. 4 need not be performed in the exact sequence as shown and likewise various blocks may be performed in parallel rather than in sequence. Accordingly, the elements of method 400 are referred to herein as "blocks" rather than "steps".

At the block 402, the controller 120 receives, via the communication interface 124, a digital image including faces.

At the block 404, the controller 120 identifies the plurality of users 111 in the digital image, based on: the faces in the digital image, and the respective facial images 238 of the plurality of users 111 stored in a memory (for example the memory 122).

At the block 406, the controller 120 determines relationships between the plurality of users 111 identified in the digital image using the relationships between the plurality of users 111 stored in the memory.

At the block 408, the controller 120 assigns the plurality of mobile devices 105 to the plurality of users 111 in the digital image.

At the block 410, the controller 120 distributes, using the communication interface 124, respective resources to the plurality of mobile devices 105 based on a respective assigned user and the relationships between the plurality of users 111 identified in the digital image.

At the block 412, the controller 120 determines whether any of the faces in the digital image were not identified. When all of the faces in the digital image were identified (e.g. a "NO" decision at the block 412), the method 400 either repeats or ends.

However, when at least one face in the digital image was not identified (e.g. a "YES" decision at the block 412), at the block 414, the controller 120 implements a remedial action, which can include, but is not limited to, one or more of: preventing people associated with the one or more unidentified faces from participating in an event for which the plurality of mobile devices 105 are being assigned; not assigning a mobile device 105 to the people associated with the one or more unidentified faces; and validating respective users 111 associated with the one or more unidentified faces, and update the memory to include the respective users. After the block 414 the method 400 either repeats or ends. Furthermore, the blocks 412, 414 may be performed in conjunction with any of the blocks 404 to 410.

Example embodiments of the method 400 will now be described with reference to FIG. 5 to FIG. 16. Each of FIG. 5, FIG. 7 to FIG. 10 and FIG. 12 to FIG. 15 is substantially similar to FIG. 1 with like elements having like numbers; similarly, each of FIG. 11 and FIG. 16 is substantially similar to FIG. 2 with like elements having like numbers.

Figure 5:
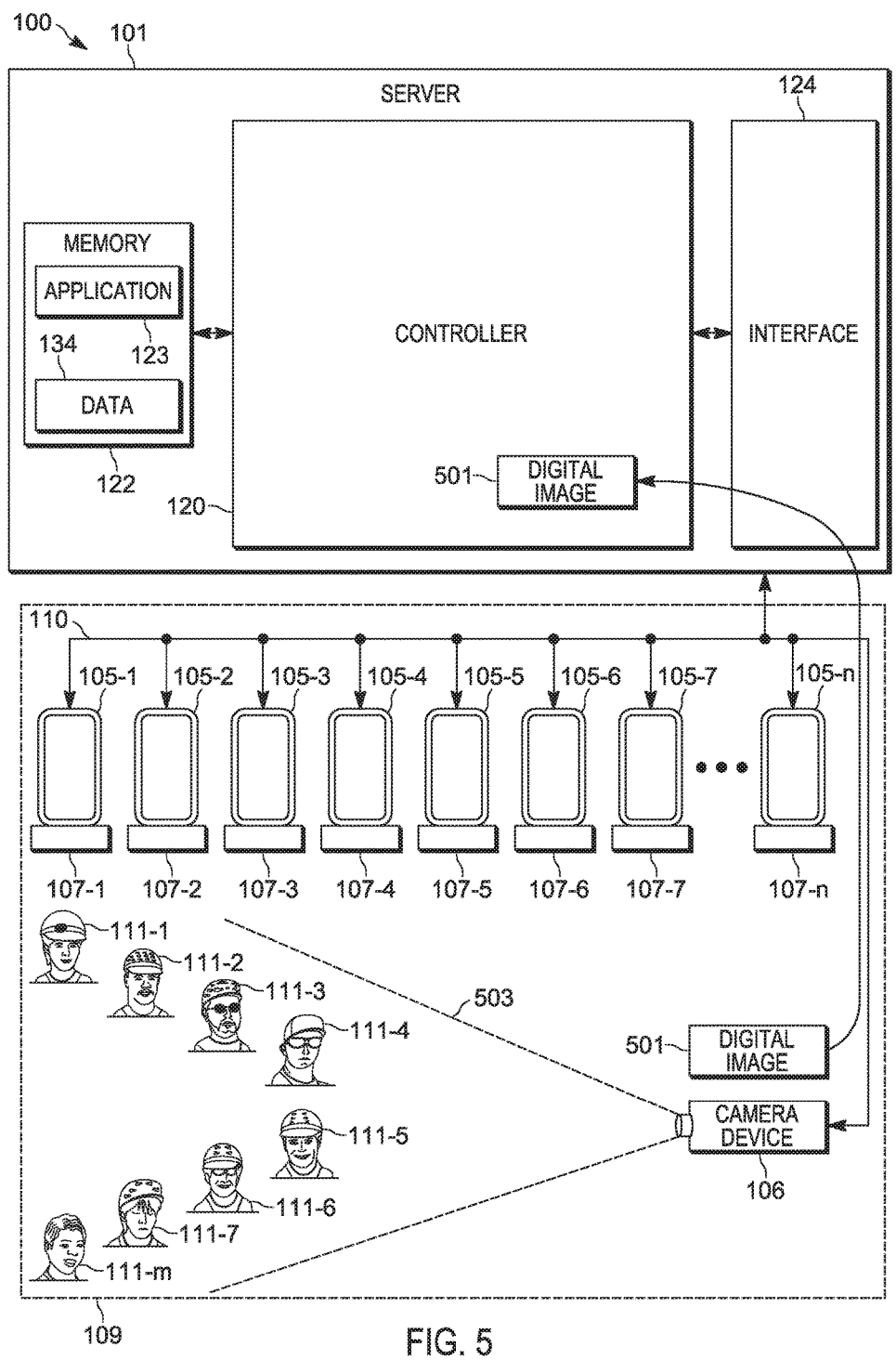
FIG. 5 depicts a camera acquiring a digital image of users, the digital image being received at the server in accordance with some embodiments.

Attention is next directed to FIG. 5 which depicts the camera device 106 acquiring a digital image 501 of the users 111. For example, the camera device 106 may be placed in a timer mode by one of the users 111, and/or another person (e.g. who is not to be assigned a device 105) may operate the camera device 106. Either way, the users 111 line up and/or assemble in a field of view 503 of the camera device 106, and the camera device 106 acquires the digital image 501 which includes faces of the users 111. The digital images 501 is transmitted to the server 101 via the links 110, and received (e.g. at the block 402) at the controller 120 via the interface 124.

As also depicted in FIG. 5, the controller 120 is implementing the application 123 which enables the controller 120 to perform one or more facial recognition techniques on the digital image to identify faces in the digital image 501. Indeed, the application 123 may include any type of facial recognition algorithm such that controller 120 is further configured to use a facial recognition algorithm to identify the plurality of users 111 in the digital image 501.

Figure 6:
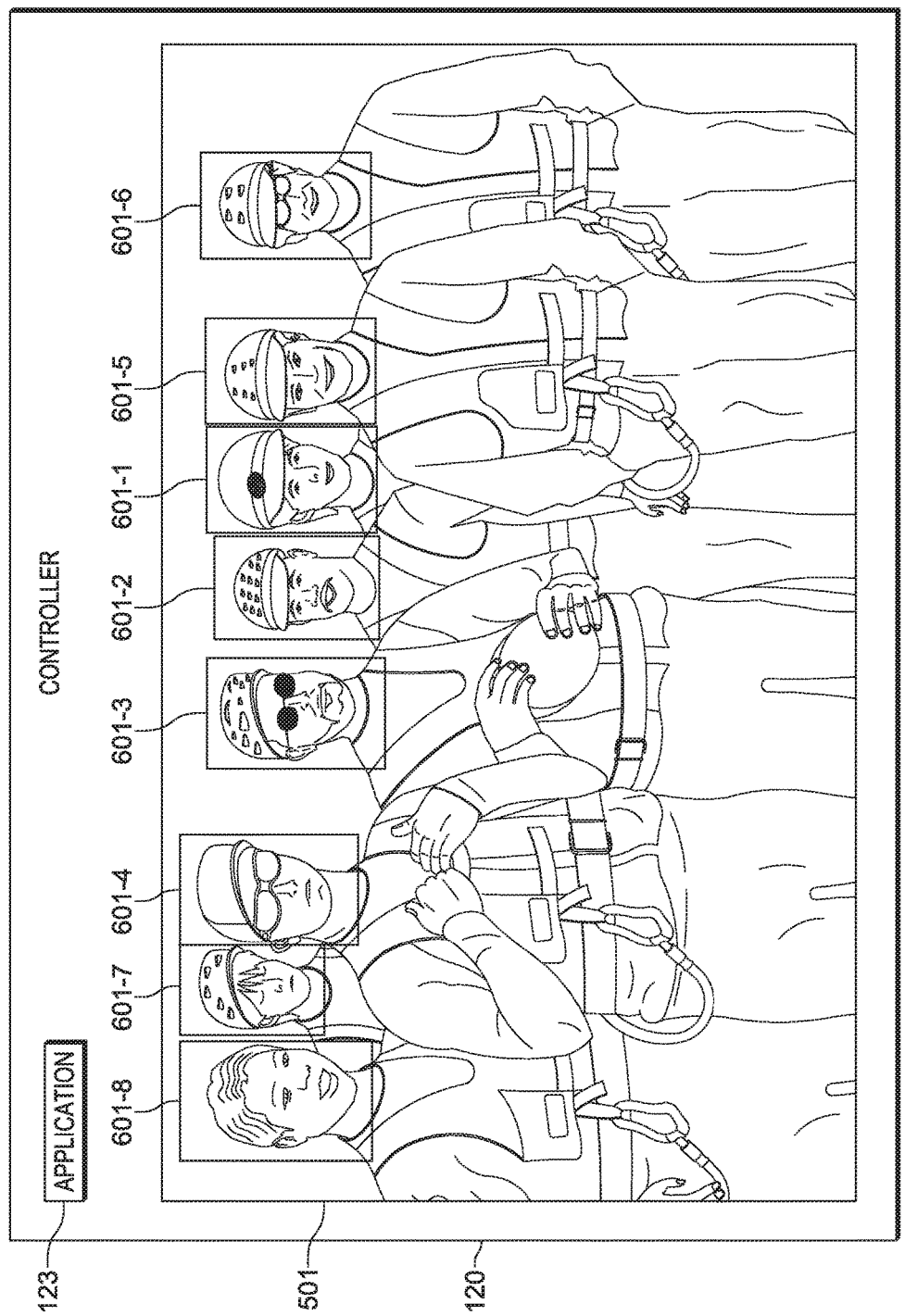
FIG. 6 depicts a controller of the server recognizing faces in the digital image in accordance with some embodiments.

For example, attention is next directed to FIG. 6 which depicts an example embodiment of the digital image 501 being processed at the controller 120, such that the controller 120 recognizes faces 601 in the digital image 501. As depicted, the controller 601 has recognized eight faces 601-1, 601-2, 602-3, 601-4, 601-5, 601-6, 601-7, 601-8 (interchangeably referred to hereafter, collectively, as the faces 601 and, generically as a face 601) in the digital image 501, as graphically indicated in FIG. 6 by boxes around each recognized face.

Figure 7:
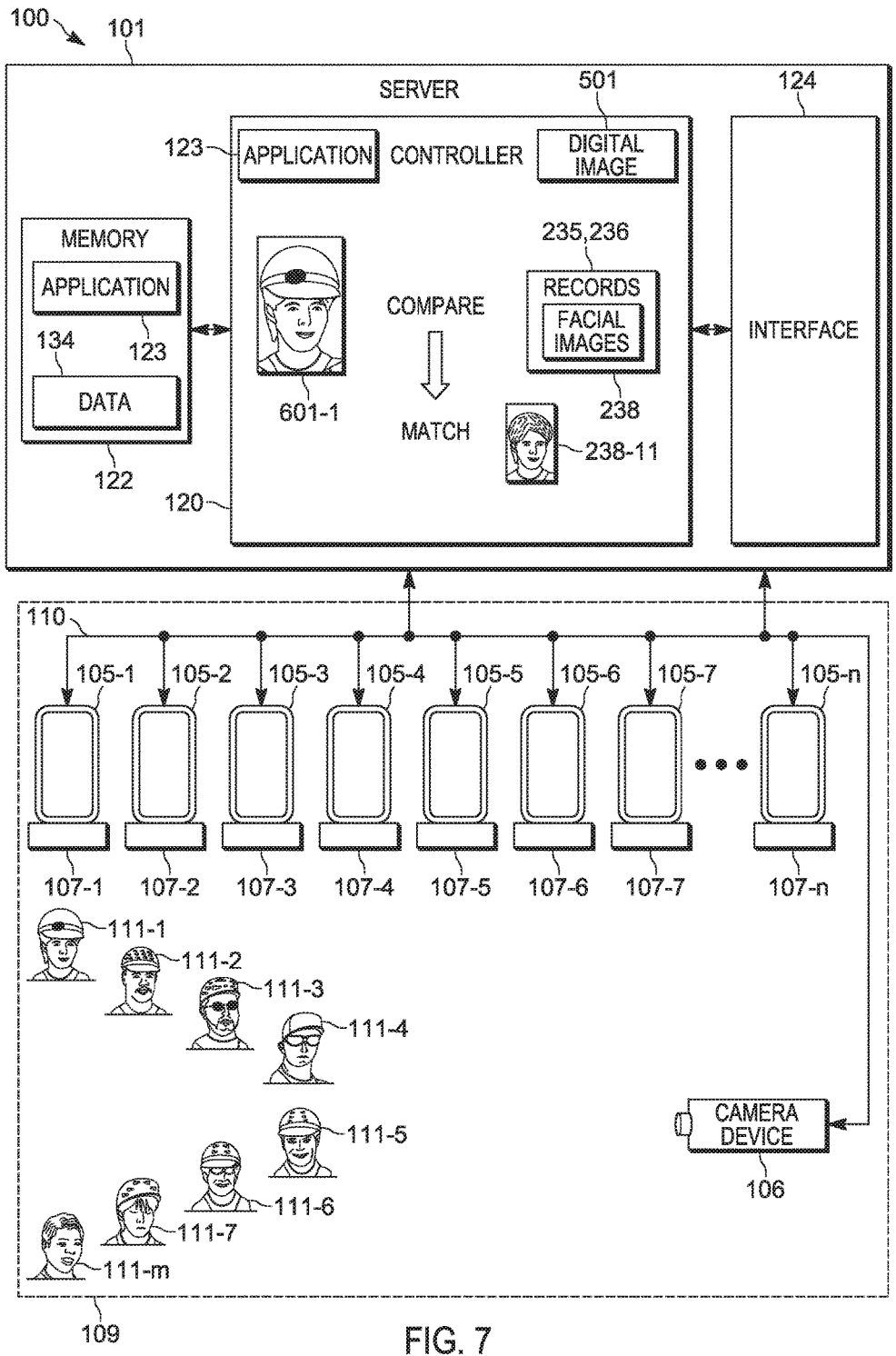
FIG. 7 depicts the controller identifying a user in the digital image by comparing a face in the digital image with stored facial images in a memory in accordance with some embodiments.

As depicted FIG. 7, the controller 120 compares a recognized face 601-1, for example as extracted from the digital image 501, to the facial images 238 in the records 235, 236. However, such a comparison may occur without explicitly extracting faces 601 from the digital image 501.

Figure 8:
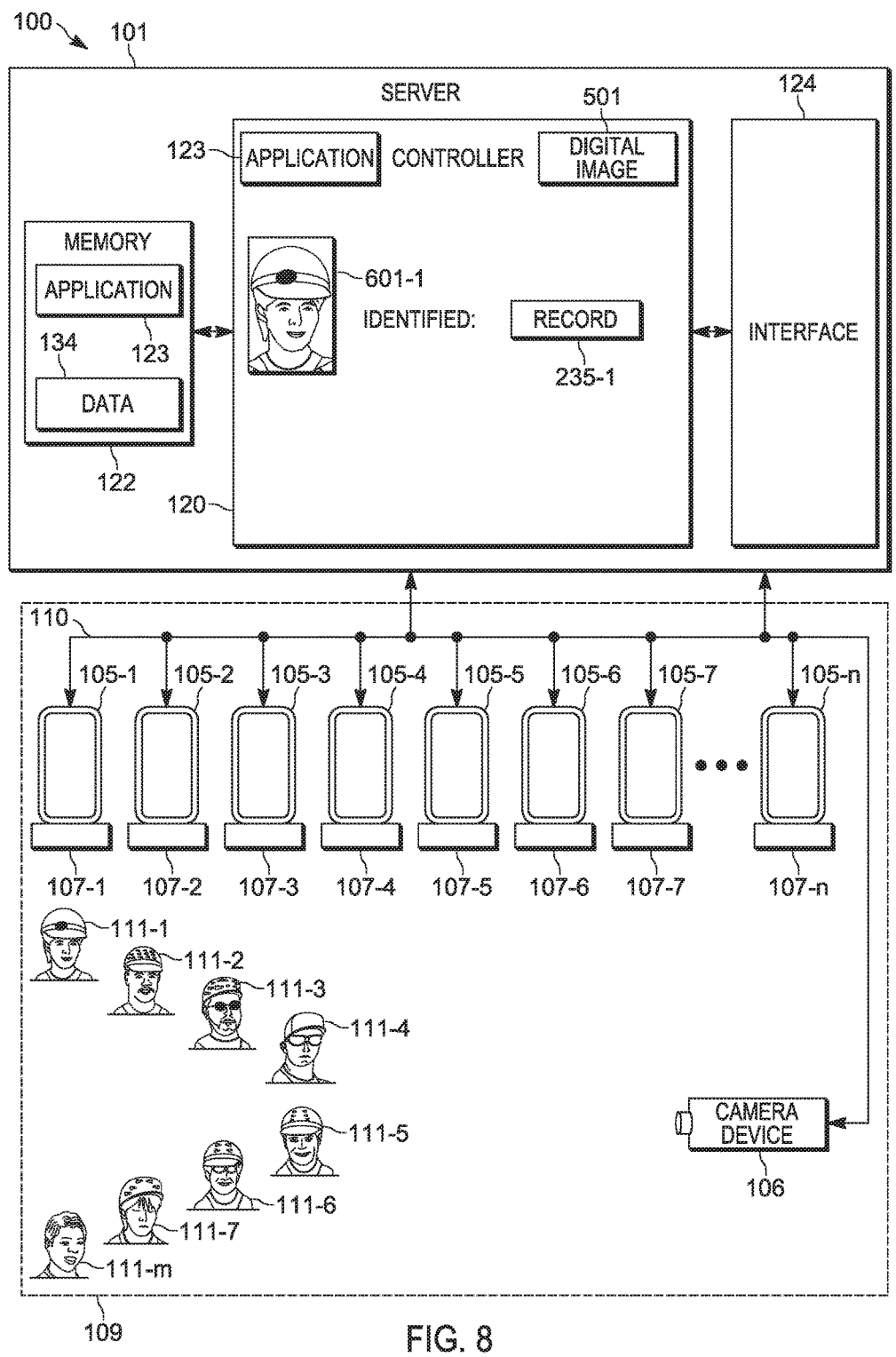
FIG. 8 depicts the controller further identifying the user in the digital image by identifying a record in which a matching facial image is stored in accordance with some embodiments.

As also depicted in FIG. 7, the controller 120 determines a match between the face 601-1 and the facial image 238-11 of the record 235-1 thereby identifying a user 111 associated with the face 601-1 as being the user associated with the record 235-1. For example, as depicted in FIG. 8, the result of the controller 120 comparing the face 601-1 to the facial images 238 in the records 235, 236 is that a user 111 associated with the face 601-1 is identified as being associated with the record 235-1. Hence, FIG. 7 and FIG. 8 depict an example embodiment of the block 404 of the method 400.

Figure 9:
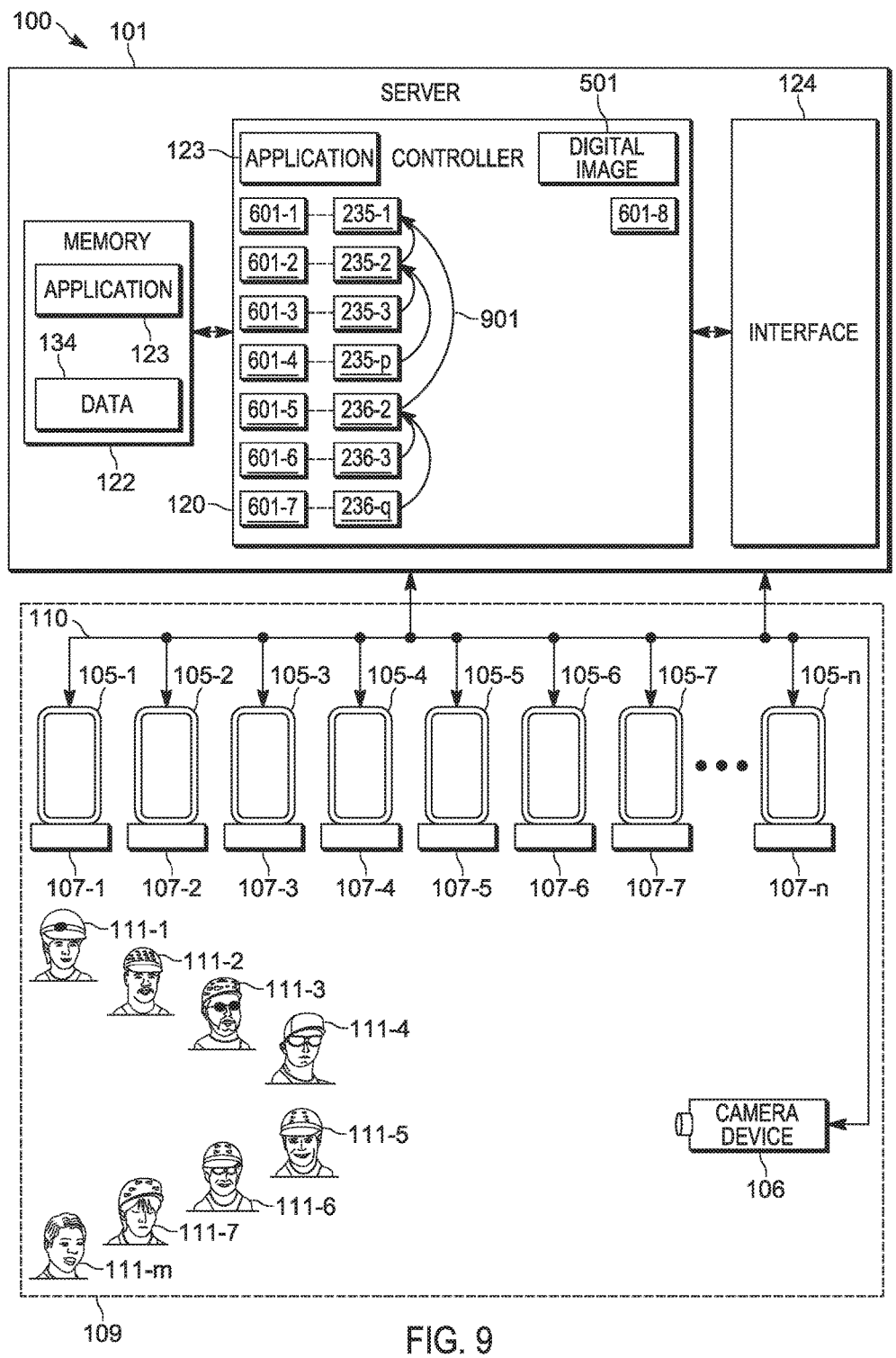
FIG. 9 depicts the controller determining relationships between users identified in the digital image in accordance with some embodiments.

Attention is next directed to FIG. 9 in which it is assumed that the controller 120 has implemented the method 400 on all the faces 601 in the digital image 501, and identified all but one of the faces 601 as represented by the broken lines between the faces 601 and the records 235, 236.

In particular, the face 601-1 is identified by the record 235-1 as described above; similarly, the faces 601-1, 601-2, 601-3, 601-4, 601-5, 601-6, 601-7 have been identified as matching respective facial images 238 in respective records 235-1, 235-2, 235-3, 235-*p*, 236-2, 236-3, 236-*q*. The face 601-8 has not been identified (e.g. a "YES" decision in block 412 of the method 400) and remedial action that may occur in conjunction with the block 414 of the method 400 will be described in more detail below with respect to FIG. 15 and FIG. 16.

FIG. 9 also depicts an example embodiment of the block 406 of the method 400 as the controller 120 determines relationships between the plurality of users 111 identified in the digital image 501 using the relationships between the plurality of users 111 stored in the memory 122. For example, as depicted, the controller 120 determines a hierarchy for the users 111 identified in the digital image 501 based, for example, on the hierarchy represented by the records 235, 236.

For example, as depicted, the arrows 901 represent a subordinate/supervisor relationship between each of the records 235, 236 associated with the users 111 identified in the digital image 501 and/or a prioritization of the users 111 identified in the digital image 501. For example, an arrow 901 extends from a record 235, 236 associated with a subordinate user 111 to another record 235, 236 associated with a supervisor user 111. Hence, for example, the users 111 associated with the records 235-2, 236-2 both report to the user 111 associated with the record 235-1. Such a relationship may be based on the user 111 associated with the records 235-1 having the highest title and/or highest position in all the hierarchies represented by the records 235, 236. Put another way, as the fire chief is the highest-ranking officer in the group of users 111 in the digital image 501, the fire chief is placed in charge of the users 111 in the digital image 501, and both the fire captain and the paramedic captain report to the fire chief.

If the chief paramedic (e.g. a user associated with the record 236-1) was also identified in the digital image 501, rules (not depicted) stored at the memory 122 and/or represented in the application 123 may be used to resolve hierarchical conflicts. For example, an incident report (not depicted) may indicate a type of event associated with the location 109 at which the users 111 have assembled. When the event is a fire event, the fire chief may be placed higher in the hierarchy, and when the event is a medical event (e.g. a medical emergency), the chief paramedic may be placed higher in the hierarchy. Put another way, the controller 120 may be further configured to determine a hierarchy of the users 111 identified in the digital image 501 based on one or more of an event type, an incident report, incident data and/or data in the incident report.

It is further noted that within the various organizations with which the users 111 are associated, a paramedic would not normally report to a fire fighter. Hence, the hierarchy represented in FIG. 9 may be temporarily established for deploying resources to the devices 105 as described hereafter.

Figure 10:
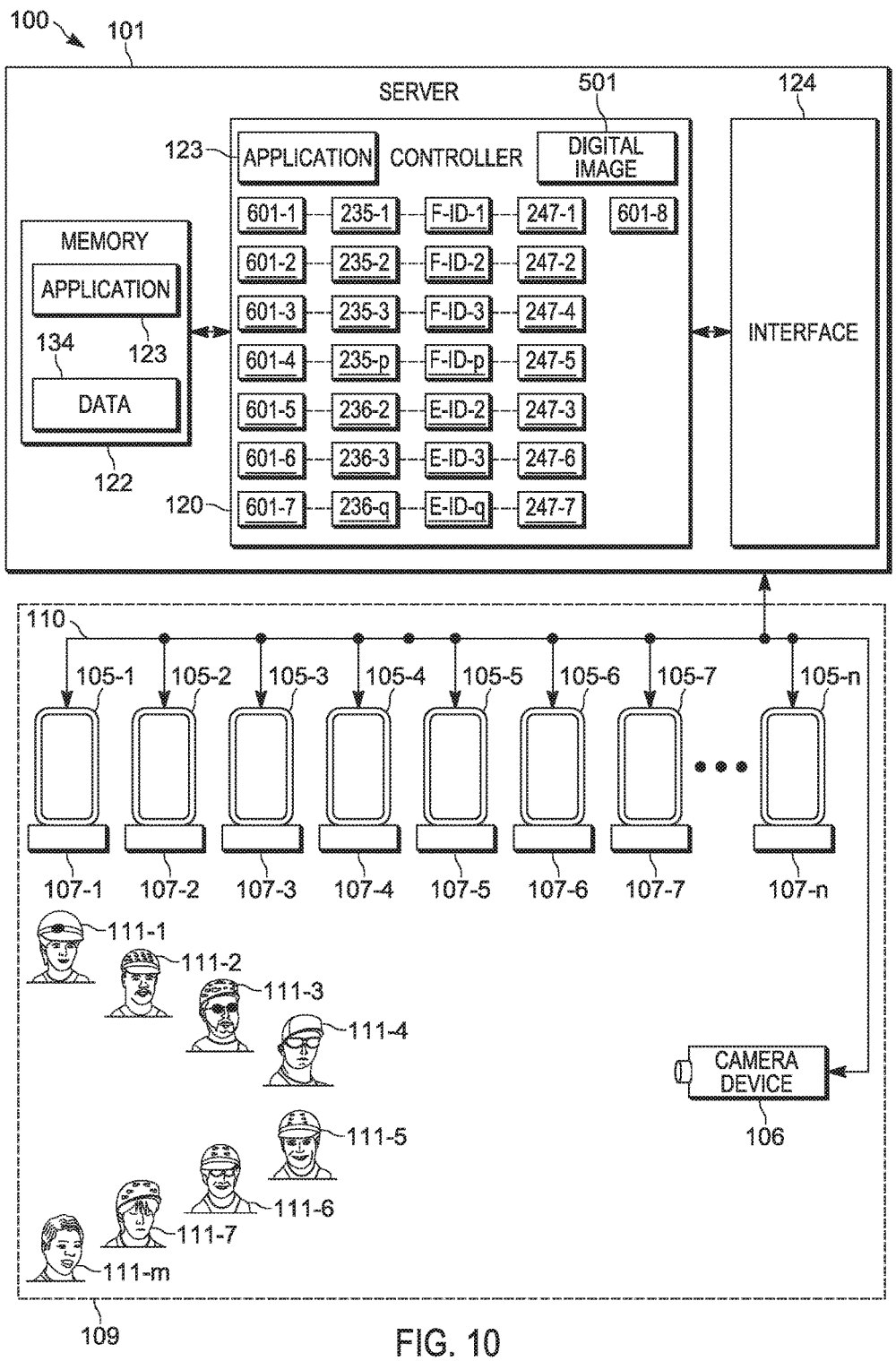
FIG. 10 depicts the controller assigning mobile devices to users identified in the digital image in accordance with some embodiments.
Figure 11:
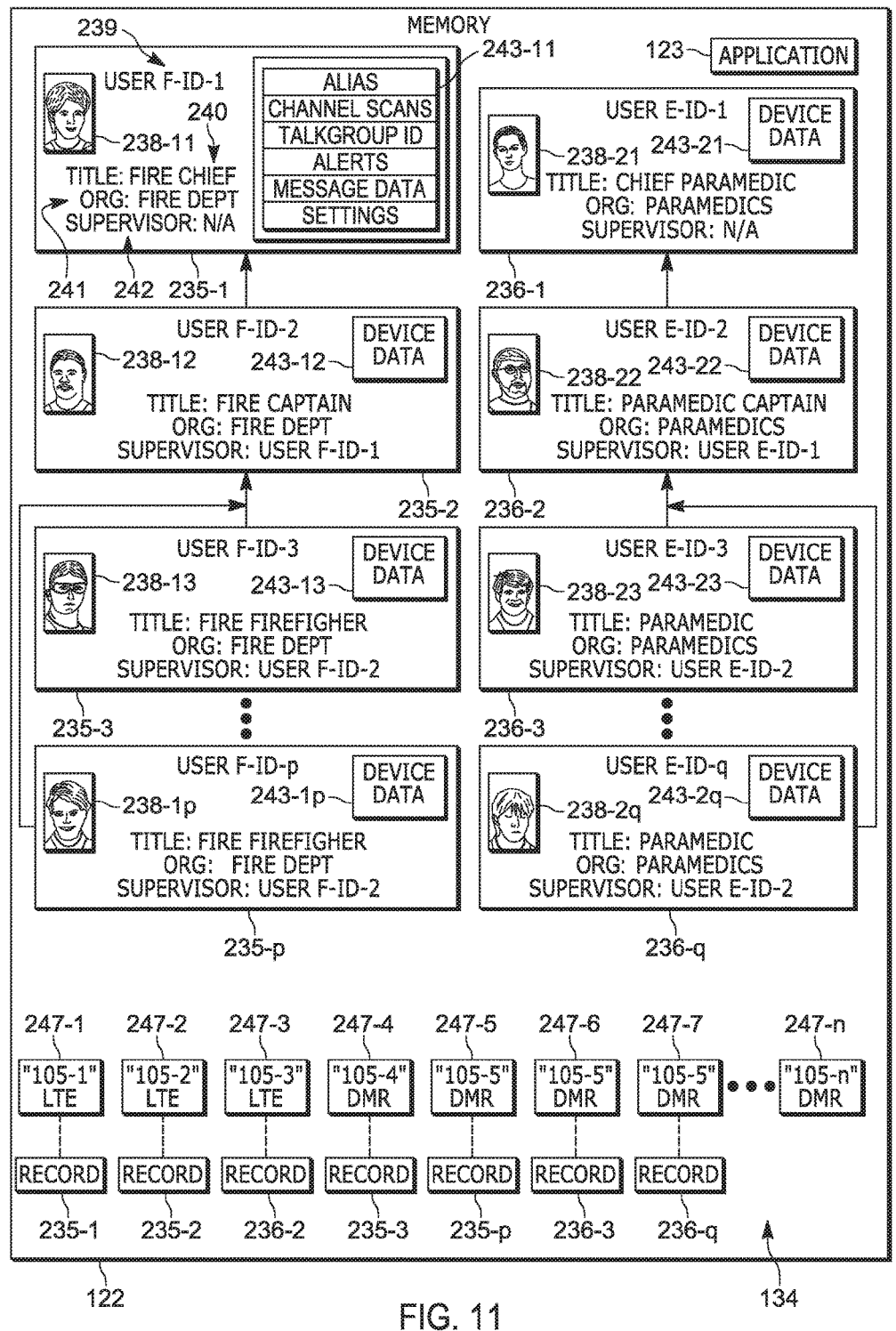
FIG. 11 depicts the memory after the mobile devices are assigned to users identified in the digital image in accordance with some embodiments.

Attention is next directed to FIG. 10 which depicts an example embodiment of the block 408 of the method 400. In particular, the controller 120 assigns devices 105 to each of the users 111 identified in the digital image 501 for example, by assigning a respective user identifier to a respective mobile device 105 and/or by associating a respective record 247 of a mobile device 105 with a record 235, 236. For example, as depicted, each of the records 235, 236 associated with users 111 identified in the digital image 501 is associated with a respective record 247 of a device 105, and/or a respective user identifier is associated with a respective record 247 of a device 105. Such associations are represented by broken lines between the records 235, 236, the user identifiers and the device records 247. Furthermore, the association between the user identifiers and the device records 247 may not be explicit, but may be represented by an association between the user records 235, 236 and the device records 247.

Hence, as depicted, the device 105-1, as represented by the record 247-1, is assigned to the user 111 associated with the record 235-1. Similarly: the device 105-2, as represented by the record 247-2, is assigned to the user 111 associated with the record 235-2; the device 105-3, as represented by the record 247-3, is assigned to the user 111 associated with the record 236-2; the device 105-4, as represented by the record 247-4, is assigned to the user 111 associated with the record 235-3; the device 105-5, as represented by the record 247-5, is assigned to the user 111 associated with the record 235-*p*; the device 105-6, as represented by the record 247-6, is assigned to the user 111 associated with the record 236-3; and the device 105-7, as represented by the record 247-7, is assigned to the user 111 associated with the record 236-*q*.

Such associations may be further updated at the memory 122 as depicted in FIG. 11. In particular, the device 105-*n* has not been assigned as only seven users 111 have been identified in the digital image 501. Furthermore, no device 105 has been assigned to the user associated with the record 236-1 (e.g. the chief paramedic) as the user is not present in the digital image 501. While such associations are depicted in conjunction with the device records 247, alternatively, an assigned device record 247 may be stored in a user record 235, 236, at least temporarily.

With reference to FIG. 9, FIG. 10 and FIG. 11, the controller 120 may be further configured to prioritize each of the plurality of mobile devices 105 based on the respective assigned user 111 and the relationships between the plurality of users 111 identified in the digital image 501 by assigning a given mobile device 105 to a given user 111. For example, as seen in FIG. 9, the users 111 associated with the records 235-1, 235-2, 236-2 have been assigned a higher priority and/or a higher position in a higher of users 111 by virtue of their position in the hierarchy determined by the controller 120; hence, as seen in FIG. 10 and FIG. 11, these users 111 are assigned devices 105-1, 105-2, 105-3 with better communication capabilities than the remaining devices 105 (e.g. the devices 105-1, 105-2, 105-3 have LTE capability).

Figure 12:
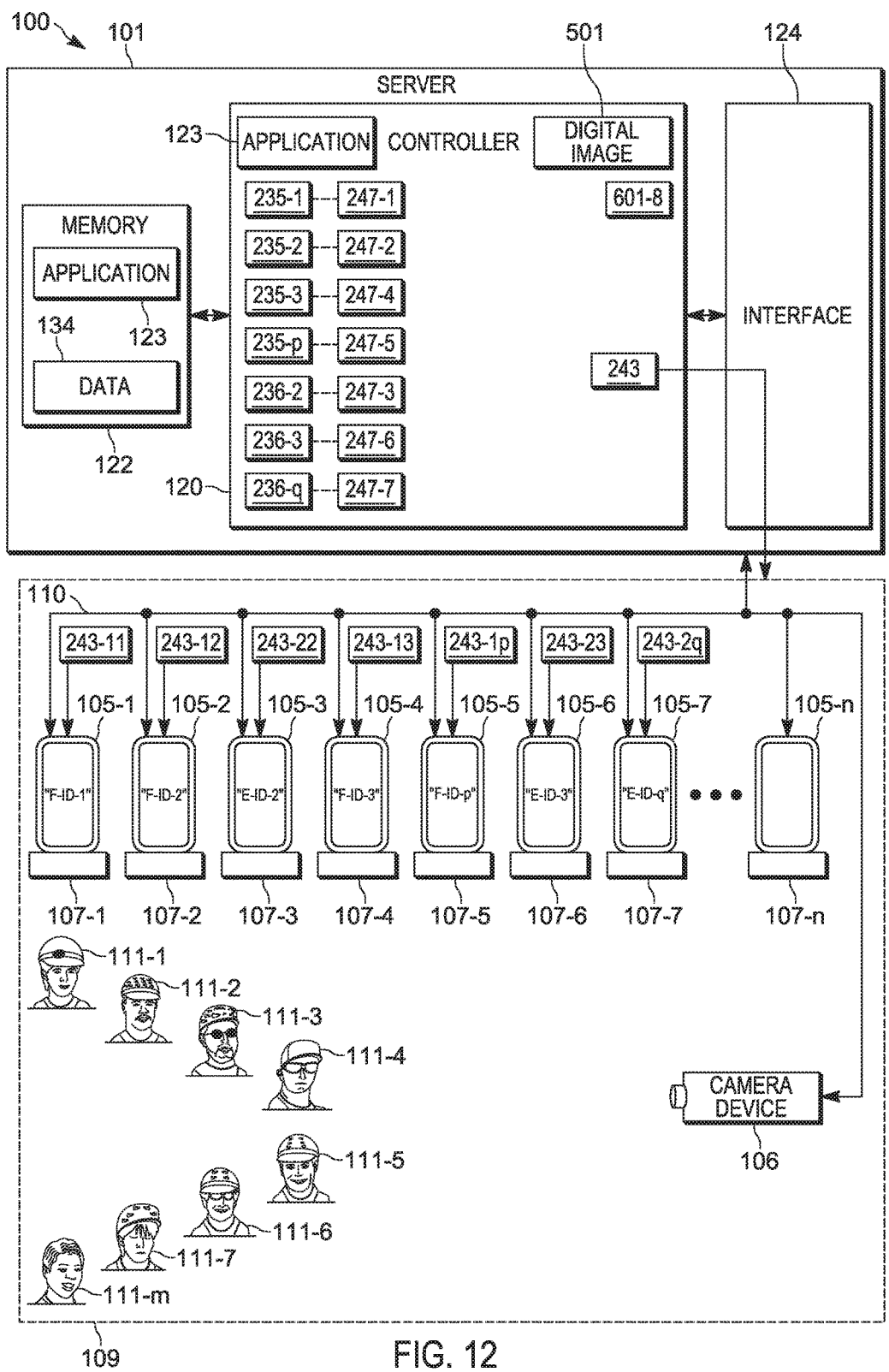
FIG. 12 depicts the controller deploying resources to the mobile devices in accordance with some embodiments.

Attention is next directed to FIG. 12 which depicts an example embodiment of the block 410 of the method 400 in which the controller 120 distributes, using the communication interface 124, respective resources to the plurality of mobile devices 105 based on a respective assigned user 111 and the relationships between the plurality of users 111 identified in the digital image 501. In particular, the controller 120 transmits respective device data 243 to each of the assigned devices 105. Hence, for example, the device 105-1 receives the device data 243-11 of the user 111 associated with the record 235-1 to which the device 105-1 has been assigned. While in FIG. 12 only the device data 243 is depicted as being transmitted to the devices 105, other data associated with the records 235, 236 may be transmitted including, but not limited to, the respective user identifiers, the respective facial images 238, and the like. Once the device data 243 is received at a respective device 105, the respective controller 320 at the device 105 uses the device data 243 to provision the devices 105. Furthermore, the device data 243 can trigger an automatic log-in of an associated user 111 into the server 101, for example to register the user 111 as currently being present at the location 109 (e.g. to participate in an associated event).

Hence, as further depicted in FIG. 12, each of the assigned devices 105 provides a notification of an assigned user, for example, as depicted, by rendering a respective user identifier of an assigned user 111. Alternatively, and/or in addition to, each of the assigned devices 105 may further render a respective facial image 238 of an assigned user 111. In this manner, each user 111 may easily retrieve the device 105 assigned to them.

Figure 13:
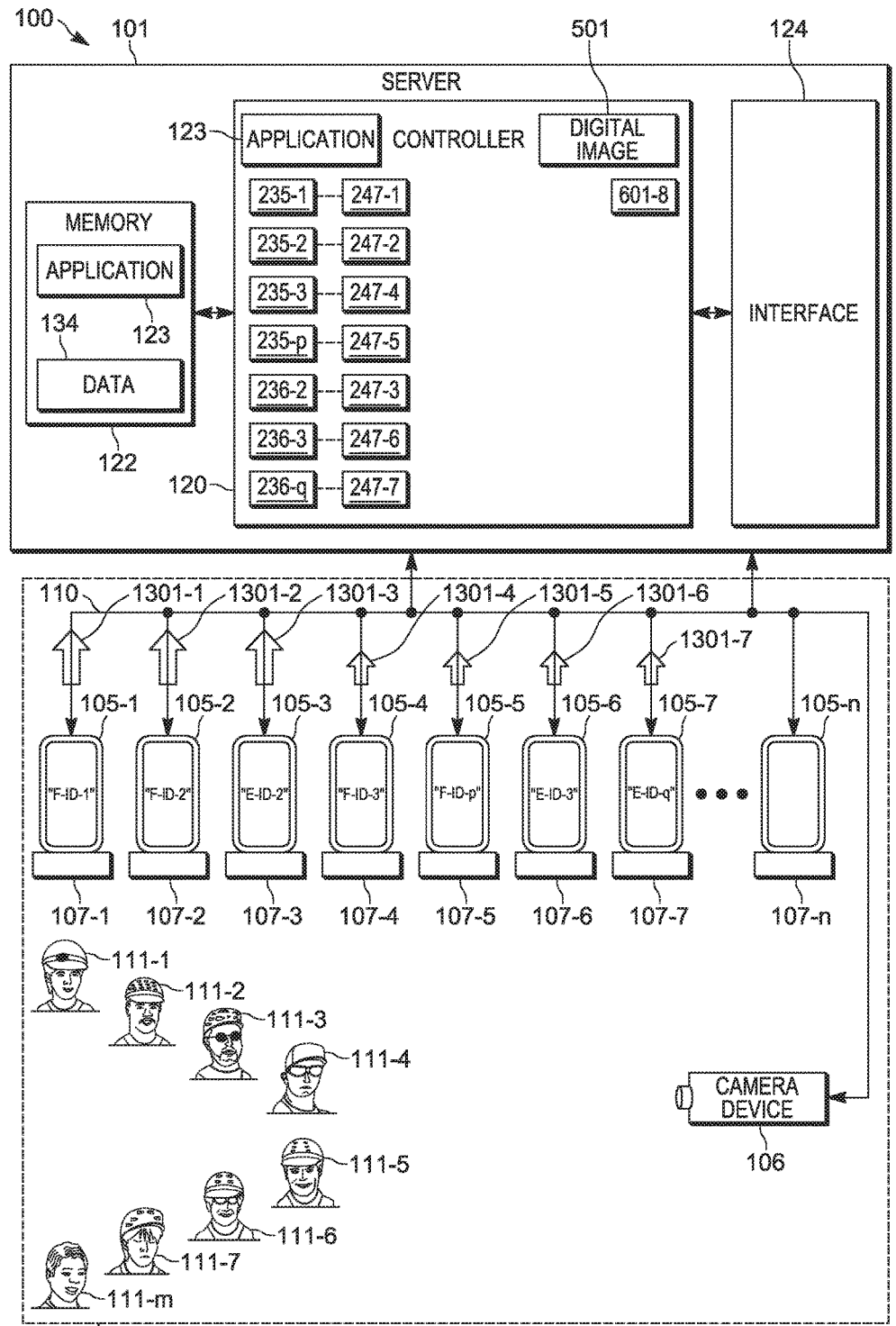
FIG. 13 depicts the controller deploying bandwidth to the mobile devices in accordance with some embodiments.
Figure 14:
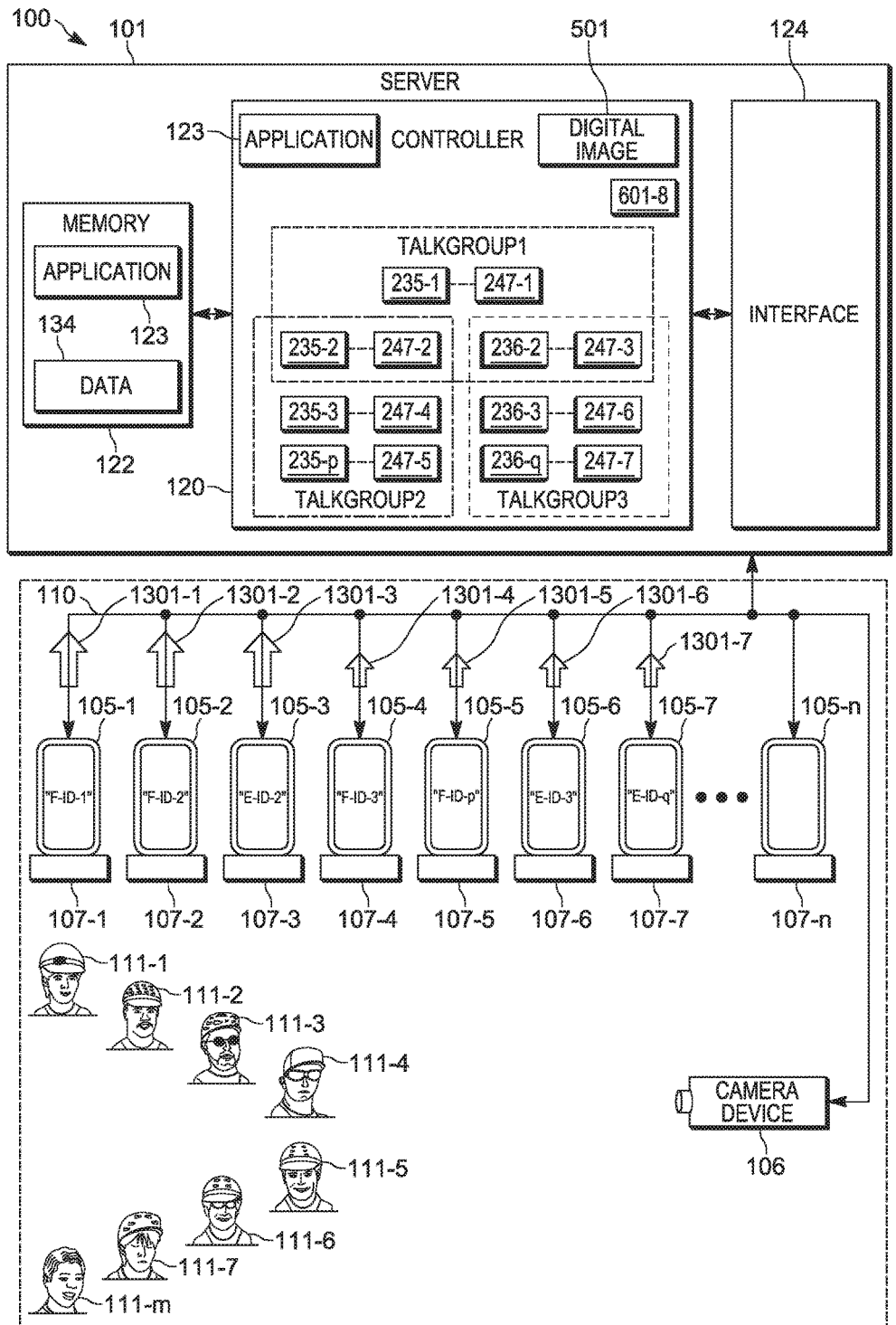
FIG. 14 depicts the controller organizing the mobile devices into talkgroups in accordance with some embodiments.

Such distribution of resources may further include assigning network resources to the assigned devices 105. For example, as depicted in FIG. 13, and as represented by a relative size of the arrows 1301-1, 1301-2, 1301-3, 1301-4, 1301-5, 1301-6, 1301-7, bandwidth of the devices 105-1, 105-2, 105-3 assigned to higher priority users 111 associated with the records 235-1, 235-2, 236-2 is higher than the bandwidth of the other devices 105. Such bandwidth assignment may occur, for example, by the server 101 throttling bandwidth on the link 110 and/or by transmitting respective commands to the devices 105 to throttle bandwidth.

Hence, a mobile device 105, assigned to a higher user in a hierarchy defined by the relationships between the plurality of users 111, may be assigned more resources than a respective mobile device 105 assigned to a lower user in the hierarchy. Hence, for example, higher priority users 111 associated with the records 235-1, 235-2, 236-2 are assigned devices 105 with better capabilities and more bandwidth than devices assigned to lower priority users and/or a lower user in the hierarchy depicted in FIG. 9.

Put another way, the controller 120 may be further configured to prioritize each of the plurality of mobile devices 105 (e.g. as represented by the bandwidth differences) based on the respective assigned user 111 and the relationships between the plurality of users 111 identified in the digital image 501. Such prioritization may include, but is not limited to, one or more of: assigning given resources to each of the plurality of mobile devices 105; and assigning a given mobile device 105 to a given user 111.

In yet further implementations, the controller 120 may be further configured to organize the plurality of mobile devices 105 into talkgroups based on the relationships between the plurality of users 111 identified in the digital image 501. For example, attention is next directed to FIG. 14 which depicts the controller 120 organizing the assigned devices 105 into three talkgroups, as represented by groupings of the associated records 235, 236, 247. For example, the devices 105 assigned to the users 111 associated with the records 235-1, 235-2, 236-2 (e.g. the fire chief and the two captains) are organized into "TalkGroup1", the devices 105 assigned to the users 111 associated with the records 235-2, 235-3, 236-3 (e.g. the fire captain and the firefighters) are organized into "TalkGroup2", and the devices 105 assigned to the users 111 associated with the records 236-2, 236-3, 236-$q$ (e.g. the paramedic captain and the two paramedics) are organized into "TalkGroup3". In other words, the devices 105 are organized into talkgroups based on the hierarchy depicted in FIG. 9.

As such, the device data 243 distributed to the devices 105, as depicted in FIG. 11, may be altered according to the relationships between the plurality of users 111. For example, any talkgroups stored in the device data 243-11 stored at the record 235-1 may be deleted from the device data 243-11 and/or replaced with the TalkGroup1 (and/or any of the talkgroups determined in FIG. 14 that include the device 105-1) prior to the device data 243-11 being transmitted to the device 105-1.

Indeed, any predefined devices settings stored in the device data 243 may be altered according to the relationships between the users 111. For example, as described above, the user 111 associated with the record 236-2 is prioritized over the other paramedic users as the user 111 associated with the record 236-2 is higher in the hierarchy represented by the records 236. However, in some embodiments, where there are a large number of paramedics (e.g. above a threshold number), the user 111 associated with the record 236-2 may not be given priority and/or additional resources over the other paramedics. Indeed, in some embodiments, the user 111 associated with the record 236-2 may be excluded from certain talkgroups, such as TalkGroup1 and/or TalkGroup2. In other words, the paramedic captain may, for the purposed of the event associated with the location 109, be treated like another paramedic without any special prioritization. Such embodiments may be implemented by altering device settings in the device data 243.

Figure 15:
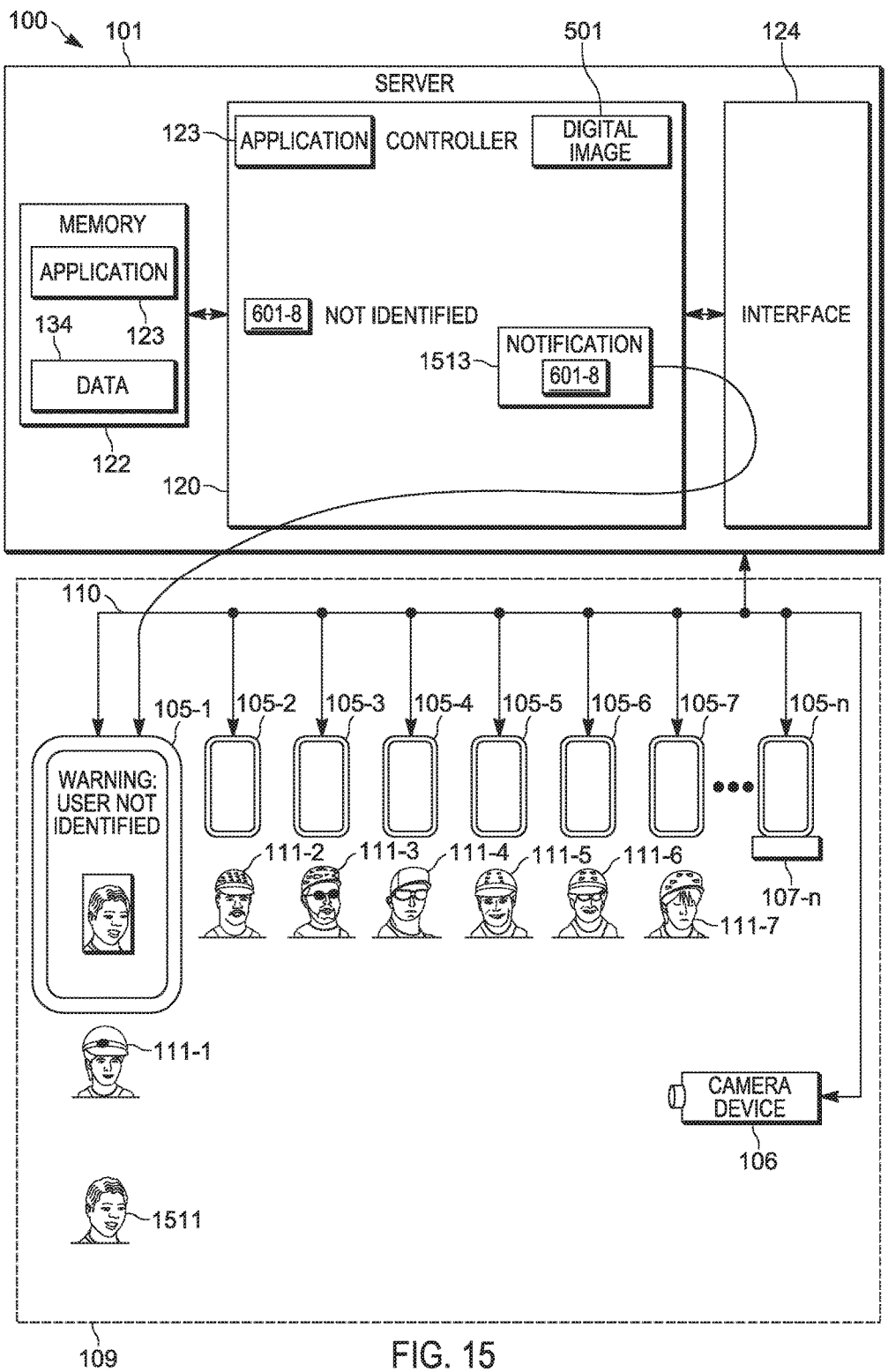
FIG. 15 depicts the controller implementing a remedial action for a person in the digital image that is not identified in accordance with some embodiments.
Figure 16:
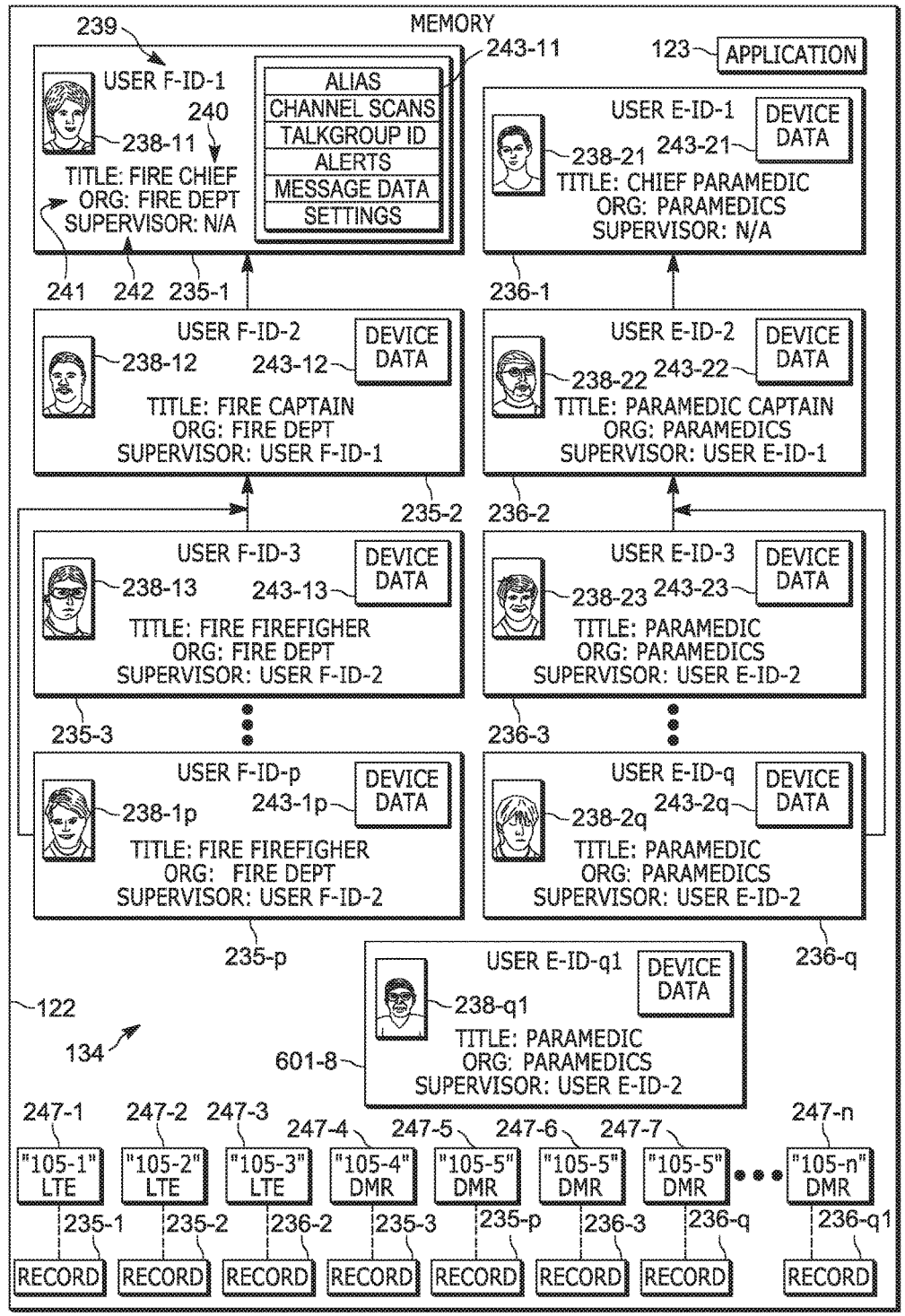
FIG. 16 depicts the memory after an unidentified person in the digital image is validated in accordance with some embodiments.

Attention is next directed to FIG. 15 which depicts an example embodiment of the blocks 412, 414 of the method 400. In FIG. 15, each of the users 111 identified in the digital image 501 has retrieved a respective assigned device 105; hence, the devices 105, other than the device 105-$n$, have been removed from a respective charger 107. However, a given person 1511 from the group of users 111 that were included in the digital image 501 has not been identified as their face 601-8 in the digital image 501 does not match any of the facial images 238. As depicted, the controller 120 is hence implementing a remedial action to prevent the person 1511 associated with the unidentified face 601-8 from participating in an event for which the plurality of mobile devices 105 are being assigned. For example, no device 105 is assigned to the person 1511. Furthermore, the controller 120 transmits a notification 1513 to the device 105-1 (e.g. a high priority device) that includes the face 601-8 which is rendered at the device 105-1 along with a warning that the user having the face 601-8 has not been identified. The user 111-1 to which the device 105-1 has been assigned may then direct one or more of the other users 111 to escort the person 1511 away from the location 109 and the like.

Alternatively, the user 111-1 to which the device 105-1 has been assigned may initiate a validation process in which the person 1511 is registered with the server 101 such that a remaining device 105 may be assigned to the person 1511. Such registration may occur via the device 105-1 and/or another of the devices 105. For example, as depicted in FIG. 16, the memory 122 may be updated to include a new record 236-q1 for the person 1511, the new record 236-q1 including the face 601-8 as the facial image, and an available device 105, such as the device 205-$n$, may be assigned to the person 1511, as represented by the device record 247-$n$ being associated with the record 236-q1.

While embodiments described herein have been directed to IDLH events, the server 101 and/or the method 400 may be used to deploy mobile devices for any type of event, and the like. For example, the mobile device 105 may be deployed to participants and organizers in a walkathon, and the like, and the records 235, 236 may identify walkers in the walkathon, and organizers of the walkathon as well as relationships between, for example, the organizers, with the devices 105 assigned accordingly, and resources deployed accordingly. For example, each walker may be assigned a DMR device, while each organizer may be assigned an LTE device, with bandwidth assigned accordingly. Furthermore, devices assigned to teams of walkers may be automatically organized into talkgroups.

Described herein is a device and method for deploying a plurality of mobile devices by acquiring a digital image of a group of people, and comparing the digital image with respective facial images of a plurality of users, and relationships between the plurality of users, as stored at a memory. Resources are deployed to the mobile devices based on the relationships between the users identified in the digital image, which may include prioritizing certain users, based on a hierarchy determined for the users.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

I claim:

1. A device comprising:
a communication interface configured to communicate with a plurality of mobile devices; and
a controller having access to a memory storing: respective facial images of a plurality of users, and relationships between the plurality of users, the controller configured to:
receive, via the communication interface, a digital image including faces;
identify the plurality of users in the digital image, based on: the faces in the digital image, and the respective facial images of the plurality of users stored in the memory;
determine relationships between the plurality of users identified in the digital image using the relationships between the plurality of users stored in the memory;
assign the plurality of mobile devices to the plurality of users in the digital image; and
distribute, using the communication interface, respective resources to the plurality of mobile devices based on a respective assigned user and the relationships between the plurality of users identified in the digital image.

2. The device of claim 1, wherein the controller is further configured to prioritize the plurality of mobile devices based on the respective assigned user and the relationships between the plurality of users identified in the digital image.

3. The device of claim 2, wherein the controller is further configured to prioritize the plurality of mobile devices based on the respective assigned user and the relationships between the plurality of users identified in the digital image by one or more of: assigning given resources to the plurality of mobile devices; and assigning a given mobile device to a given user.

4. The device of claim 1, wherein a mobile device, assigned to a higher user in a hierarchy defined by the relationships between the plurality of users, is assigned more resources than a respective mobile device assigned to a lower user in the hierarchy, the hierarchy comprising one or more of: working relationships between the plurality of users, a reporting structure and a priority structure.

5. The device of claim 1, wherein the controller is further configured to organize the plurality of mobile devices into talkgroups based on the relationships between the plurality of users identified in the digital image.

6. The device of claim 1, wherein the memory further stores user identifiers of the plurality of users, and the controller is further configured to assign the plurality of mobile devices to the plurality of users in the digital image by: assigning a respective user identifier to a respective mobile device.

7. The device of claim 1, wherein the controller is further configured to:
 determine one or more unidentified faces in the digital image that cannot be identified from the respective facial images of the plurality of users stored in the memory; and,
 in response, one or more of:
  implement a remedial action to prevent people associated with the one or more unidentified faces from participating in an event for which the plurality of mobile devices are being assigned;
  not assign a mobile device to the people associated with the one or more unidentified faces; and
  validate respective users associated with the one or more unidentified faces, and update the memory to include the respective users.

8. The device of claim 1, wherein the respective resources distributed to each the plurality of mobile devices include one or more of: an alias of the respective assigned user, channel scans associated with the respective assigned user, talkgroup identifiers associated with the respective assigned user, audio alerts associated with the respective assigned user, preconfigured messaging data associated with the respective assigned user and predefined device settings altered according to the relationships between the plurality of users.

9. The device of claim 1, wherein the controller is further configured to use a facial recognition algorithm to identify the plurality of users in the digital image.

10. A method comprising:
 receiving, at a controller, via a communication interface, a digital image including faces, the communication interface configured to communicate with a plurality of mobile devices, the controller having access to a memory storing: respective facial images of a plurality of users, and relationships between the plurality of users;
 identifying, at the controller, the plurality of users in the digital image, based on: the faces in the digital image, and the respective facial images of the plurality of users stored in the memory;
 determining, at the controller, relationships between the plurality of users identified in the digital image using the relationships between the plurality of users stored in the memory;
 assigning, at the controller, the plurality of mobile devices to the plurality of users in the digital image; and
 distributing, using the communication interface, respective resources to the plurality of mobile devices based on a respective assigned user and the relationships between the plurality of users identified in the digital image.

11. The method of claim 10, further comprising prioritizing, at the controller, the plurality of mobile devices based on the respective assigned user and the relationships between the plurality of users identified in the digital image.

12. The method of claim 11, further comprising prioritizing, at the controller, the plurality of mobile devices based on the respective assigned user and the relationships between the plurality of users identified in the digital image by one or more of: assigning given resources to the plurality of mobile devices; and assigning a given mobile device to a given user.

13. The method of claim 10, wherein a mobile device, assigned to a higher user in a hierarchy defined by the relationships between the plurality of users, is assigned more resources than a respective mobile device assigned to a lower user in the hierarchy, the hierarchy comprising one or more of: working relationships between the plurality of users, a reporting structure and a priority structure.

14. The method of claim 10, further comprising organizing, at the controller, the plurality of mobile devices into talkgroups based on the relationships between the plurality of users identified in the digital image.

15. The method of claim 10, wherein the memory further stores user identifiers of the plurality of users, and wherein the method further comprises assigning, at the controller, the plurality of mobile devices to the plurality of users in the digital image by: assigning a respective user identifier to a respective mobile device.

16. The method of claim 10, further comprising:
 determining, at the controller, one or more unidentified faces in the digital image that cannot be identified from the respective facial images of the plurality of users stored in the memory; and,
 in response, one or more of:
  implementing a remedial action to prevent people associated with the one or more unidentified faces from participating in an event for which the plurality of mobile devices are being assigned;
  not assigning a mobile device to the people associated with the one or more unidentified faces; and
  validating respective users associated with the one or more unidentified faces, and update the memory to include the respective users.

17. The method of claim 10, wherein the respective resources distributed to each the plurality of mobile devices include one or more of: an alias of the respective assigned user, channel scans associated with the respective assigned user, talkgroup identifiers associated with the respective assigned user, audio alerts associated with the respective assigned user, preconfigured messaging data associated with the respective assigned user and predefined device settings altered according to the relationships between the plurality of users.

18. The method of claim 10, further comprising using, at the controller, a facial recognition algorithm to identify the plurality of users in the digital image.

\* \* \* \* \*